INVENTOR.
Alfred M. Moen,
BY Parker & Carter
Attorneys.

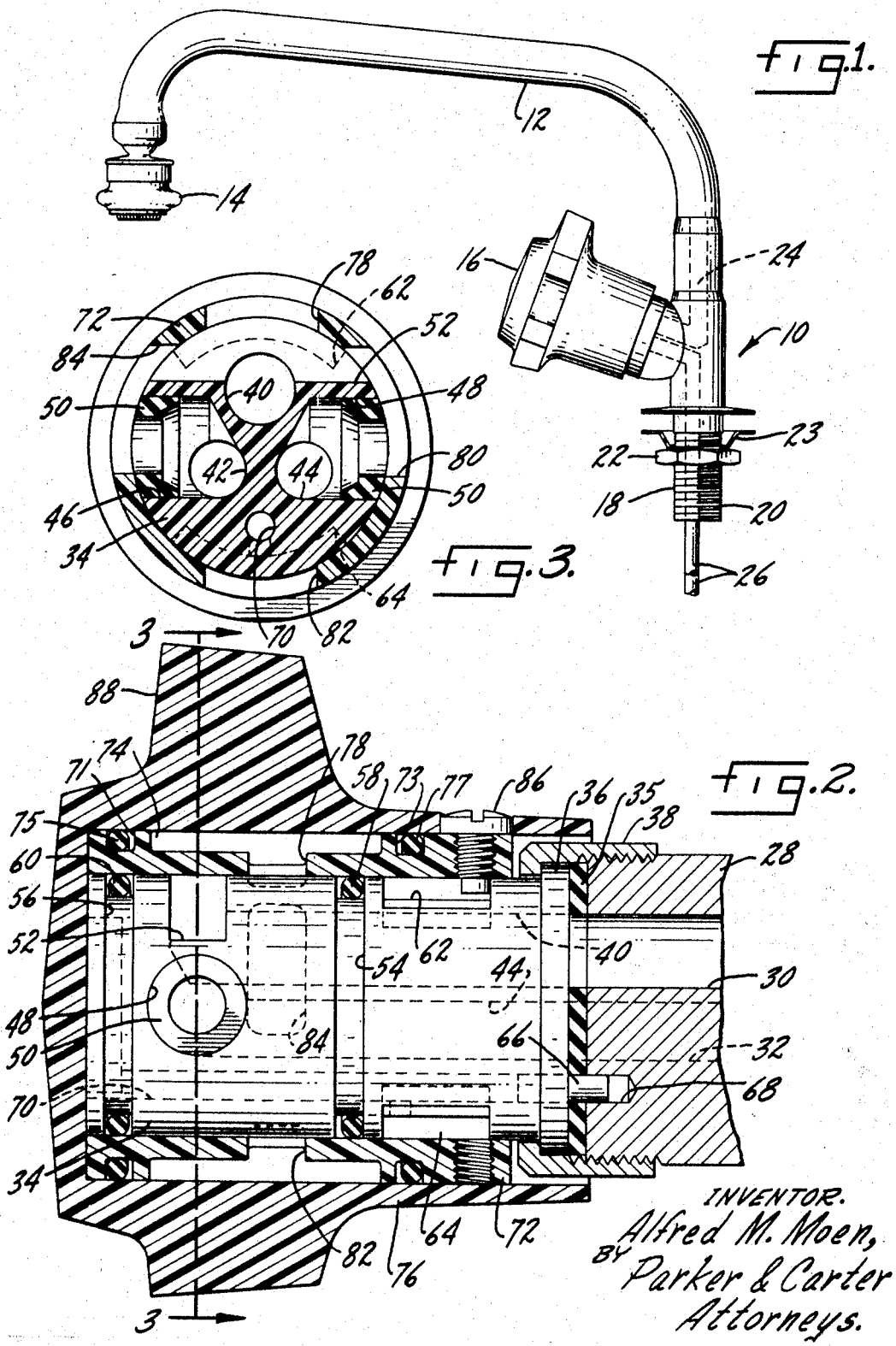

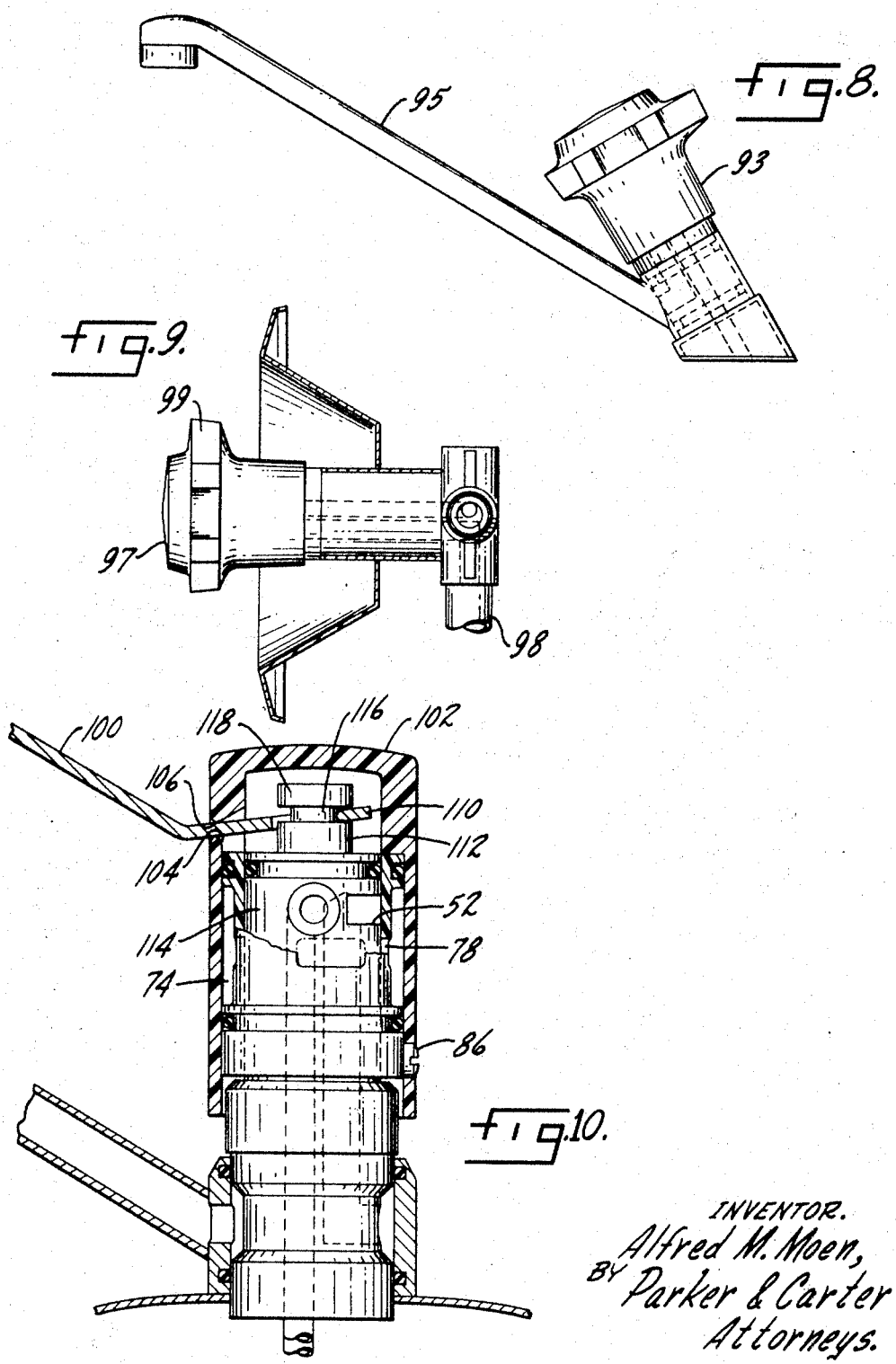

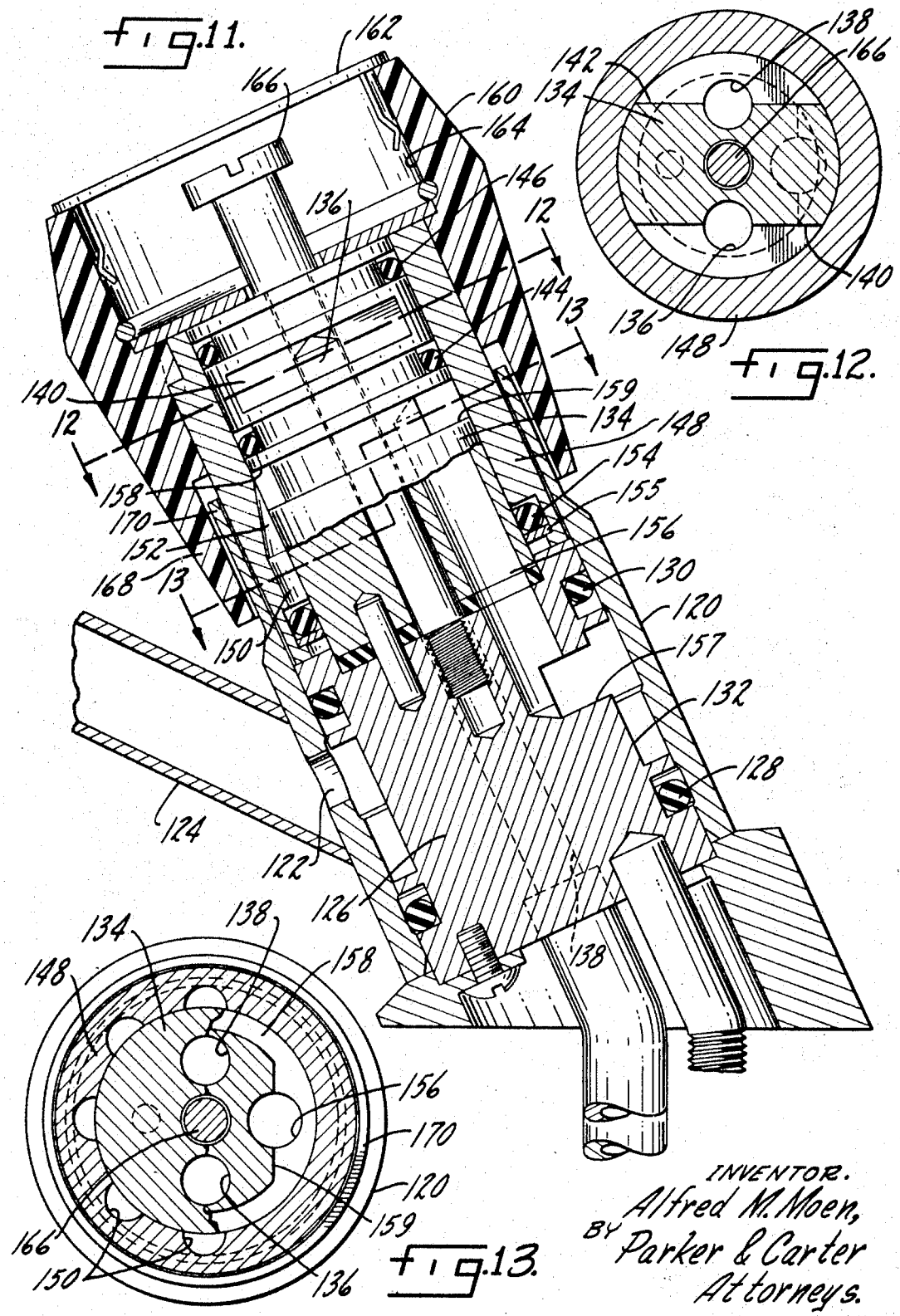

United States Patent Office 3,460,571
Patented Aug. 12, 1969

3,460,571
HANDLE VALVE
Alfred M. Moen, 25 Lakeview Drive,
Grafton, Ohio 43331
Filed Feb. 23, 1966, Ser. No. 529,498
Int. Cl. F16k 11/14; E03c 1/05
U.S. Cl. 137—625.17                        19 Claims

ABSTRACT OF THE DISCLOSURE

A single handle hot and cold water mixing faucet made up a body member having hot and cold water inlet passages which terminate on its exterior and a handle rotatable and reciprocal on the body member. The handle includes a confined mixing chamber. There is at least one portion of reduced size connecting the mixing chamber with the exterior of the body member and hence with the hot and cold water inlet passages. There are outlet means also connected to the circumferentially extending mixing chamber. Rotation of the handle relative to the body member selectively places the hot and cold water inlet passages into communication with the mixing chamber to vary the volume and temperature of water discharge through the outlet means.

---

This invention relates to a single handle mixing faucet and in particular to a mixing faucet in which the water mixing chamber is within the faucet handle.

A primary purpose of the invention is a mixing faucet, suitable for use in the home, having a simplified construction and a minimum number of parts.

Another purpose is a mixing valve including a body member having axially extending hot and cold water inlet passages and a handle reciprocal and rotatable on the body member for controlling the volume and temperature of the water discharge.

Another purpose is a mixing faucet having parts which are reversible to compensate for installations in which the hot and cold water pipes are reversed in position.

Another purpose is a mixing faucet in which the mixing chamber is within the manual operating member.

Figure 4A:
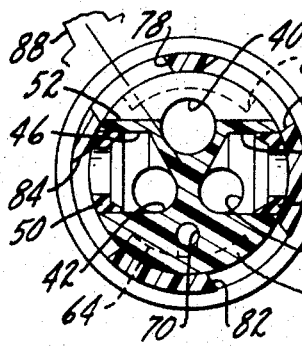
Figure 4B:
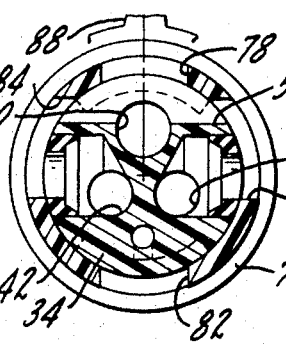
Figure 4C:
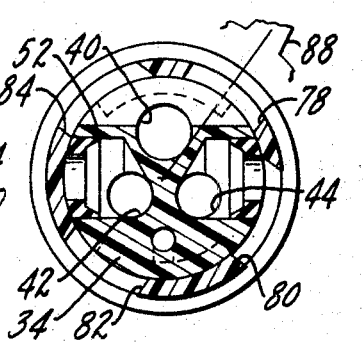
Figure 5A:
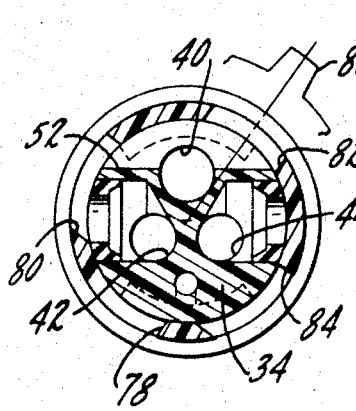
Figure 5B:
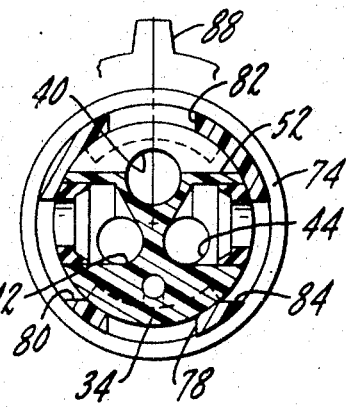
Figure 5C:
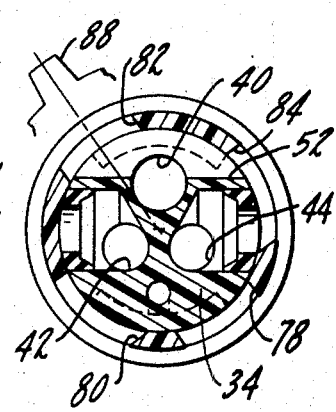
Figure 6:
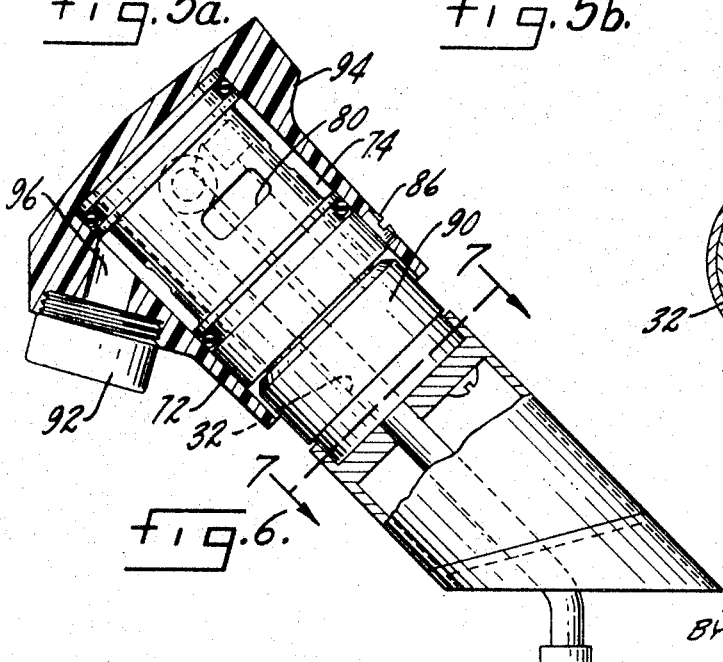
Figure 7:
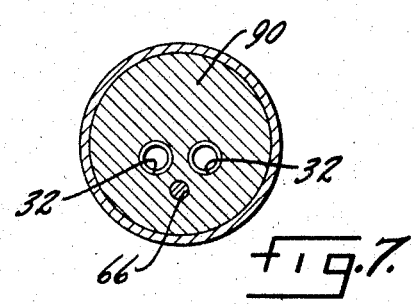

Other purposes will appear in the ensuing specification, drawings and claims:

The invention is illustrated diagrammatically in the following drawings wherein:

FIGURE 1 is a diagrammatic illustration of a faucet utilizing a valve of the type described, FIGURE 2 is an enlarged axial section of the mixing valve disclosed herein, FIGURE 3 is a section along plane 3—3 of FIGURE 2, with the valve in open position, FIGURES 4a, 4b and 4c are sections similar to FIGURE 3, illustrating the valve in different rotary positions, FIGURES 5a, 5b and 5c are sections, similar to FIGURES 4a, 4b and 4c, but with the hot and cold water pipe positions reversed, FIGURE 6 is a side elevation, with a portion of the handle cut away, illustrating a modified form of valve, FIGURE 7 is a section along plane 7—7 of FIGURE 6, FIGURE 8 is a side elevation of a further form of valve and faucet combination, FIGURE 9 is a side elevation of yet a further form of combination valve and faucet illustrating the principles disclosed herein, and FIGURE 10 is an axial section through a faucet of the type described utilizing an operating lever.

The present invention is particularly concerned with a mixing valve or mixing faucet in which the number of valve parts is kept to a minimum and in which the mixing chamber is within the handle which is reciprocated and rotated by the user. In FIGURE 1, a faucet indicated generally at 10 may include a spout 12 having a discharge device 14 and an operating handle 16. Mounting means 18 may be formed at the bottom of the faucet and may include a threaded section 20 on which a conventional nut 22 and washer 23 are mounted. The faucet 10 may include an outlet conduit 24 and a pair of inlet conduits indicated at 26.

Turning now to the valve itself, as illustrated in FIGURES 2 and 3, a mounting member 28 may have a discharge conduit or passage 30 and a pair of inlet conduits or passages, indicated at 32. A generally cylindrical body member 34 may be fixed to the mounting member 28 by means of a shoulder 36 on the body member and a collar 38 which is screw-threaded to the mounting member and has a portion overlying the shoulder 36. A rubber gasket 35 may be positioned between member 28 and shoulder 36. The body member 34 may include a discharge passage 40 and hot and cold water inlet passages 42 and 44. Note particularly FIGURE 3. The inlet passages 42 and 44 may terminate in radially directed ports 46 and 48, respectively, which open to the exterior or outside surface of the body member 34. Rubber grommets or seal rings 50 may be positioned at the outside of the ports 46 and 48 to seal the ports against the piston described hereinafter. In some applications it may be desirable to place a spring behind the grommets 50 to maintain an outward bias on them for providing a firm seal. When the faucet is closed, the grommets 50 provide the only seal between the faucet inlet and outlet.

The outlet conduit or passage 40 may terminate in a cut-away portion or slot 52 which is in communication with the exterior of the body member so that water from outside of the body member may flow into the cut-out area 52 and then down through the discharge passage 40. There may be a pair of spaced annular grooves 54 and 56 in the exterior surface of the body member and seal rings 58 and 60 may be positioned in the grooves 54 and 56 respectively. Note that the seal rings 58 and 60 are on opposite sides of the ports 46 and 48 and the cut-away area 52 so as to preclude seepage of water axially along the exterior surface of the body member.

There may be a pair of diammetrically opposed slots 62 and 64 in the exterior of the body member 34 for use in limiting rotational and axial movement of the handle relative to the body member. The body member structure may be completed by a locater pin 66 which extends into a bore 68 in the mounting member 28. A vent passage 70, coaxial with bore 68, may extend axially through the body member and is in communication with slot 64 and with the exterior of the body member, inside of the handle, as illustrated particularly in FIGURE 2. The vent passage 70 permits air within the valve to escape to the outside and thus prevents pressure build-up in the valve during its movement.

A generally cylindrical piston 72 is rotatably and reciprocally mounted on the body member 34 and may have an exterior annular groove 74 which cooperates with a handle 76 to form an annular mixing chamber. There may be a plurality of circumferential slots indicated at 78, 80, 82 and 84 which connect annular groove 74 with the interior of the piston 72 and hence the exterior of the body member for use in placing the mixing chamber 74 in communication with the body member inlet passages.

The valve structure illustrated in FIGURES 2 and 3 may be completed by the handle member 76, which is fixed to the piston 72 by means of a set screw or the like 86 which extends into slot 62 on the exterior of the body member. The set screw 86 holds the piston and body member together as a unit and limits movement of the handle means relative to the body member. The handle 76 may have a pointer 88 for use in indicating whether the faucet is discharging hot water or cold water, or a combination of the two. The exterior of the piston 72 may have annular grooves 71 and 73 positioned on opposite sides of annular groove 74, with grooves 71 and 73 containing seal rings 75 and 77 which prevent water seepage along the exterior of the piston.

The faucet illustrated in FIGURES 2 and 3 is turned on by pulling the handle in an outward direction to place the cut-away portion 52 on the body member in communication with one or more of the slots 78–84 on the piston 72. Once the handle has been pulled out, the temperature of the water discharge can then be controlled by rotating the handle. Considering the three views of FIGURE 4, the left-hand view illustrates the position of the faucet when only hot water is being discharged. Water from passage 42 flows through port 46, and through slot 84 into the annular mixing chamber 74. Water flows around the mixing chamber and then inwardly through slot 78 into the cut-away portion 52 and hence into the discharge passage 40. Cold water port 48 is blocked by the section of the piston between slots 80 and 82. The middle drawing of FIGURE 4 illustrates the position of the faucet when generally equal amounts of hot and cold water are being discharged from the faucet. Both ports 46 and 48 are in communication with the annular mixing chamber 74. In the right-hand view of FIGURE 4 the discharge is wholly cold water in that only port 48 is in communication with the annular chamber 74.

FIGURE 5 illustrates a sequence of valve operations similar to FIGURE 4, except that the position of the hot and cold water pipes are reversed. It is generally the practice in plumbing in the United States to have the cold water pipe on the right and the hot water pipe on the left, however, in some situations the pipes may be reversed. The valve disclosed herein may easily be arranged to accommodate such a reversal in that the handle may be removed, after removal of set screw 86 and piston 72 turned around 180 degrees. The position of handle member 76 is the same with only piston 72 being reversed. Valve operation would be the same, the only difference being that the position of the hot and cold water pipes is reversed. Reversal of the handle may also be used, if desired, to accommodate faucets having a bottom discharge and a top discharge.

In the left-hand view of FIGURE 5, the discharge is wholly cold water in that the hot water port, which is on the right, is closed. The center view of FIGURE 5 illustrates the position of the valve when generally equal amounts of hot and cold water are being discharged. Again, the right-hand view of FIGURE 5 illustrates the position of the valve when wholly hot water is being discharged. Note that the left-hand cold water port is closed. The pointer of FIGURE 5 is on the top of the faucet, as in FIGURE 4, but the selection is just the reverse of the pointer.

FIGURES 6 and 7 illustrate a modified form of the faucet and valve disclosed herein in which the discharge passage 30 is eliminated in the mounting member 90 and the faucet discharges directly through a spout which is in communication with the annular mixing chamber 74. By eliminating the water discharge passage 30, water is forced to leave the faucet, from the annular mixing chamber 74, through a spout 92 which may be a part of the handle 94. The handle 94 is generally the same as handle 76 described in connection with the form of FIGURES 2 and 3. However, in this case it may have a spout opening for water discharge. There is a passage 96 which connects the spout 92 with the annular mixing chamber 74. The valve structure within the handle is the same as illustrated in FIGURES 2 and 3.

The faucet illustrated in FIGURE 1 may be of the type commonly used in a kitchen, although obviously it is not limited to this use. The overall faucet structure illustrated in FIGURES 6 and 7 may be more suitable for use in a bathroom basin. FIGURE 8 illustrates a slightly modified form of kitchen faucet in which a handle 93 which includes the valve for operating the faucet, is placed behind the water discharge spout 95, rather than in front of it as illustrated in FIGURE 1. Both forms are equally satisfactory and the valve structures within the handle are identical.

FIGURE 9 illustrates yet a further form of the invention in which the valve structure is within and includes a handle. In this case the overall faucet is more suitably arranged for use in a tub. Note the water discharge pipe 98 which is arranged for conventional tube discharge. The valve handle 97 may have a pointer 99 which can be arranged to point up when the valve is used in a shower installation and down when used for a tub.

FIGURE 10 shows a valve similar to that of FIGURES 2 and 3, with the addition of a lever 100 for operating the faucet. A handle 102, similar to the handle of FIGURES 2 and 3, has an opening 104 for lever 100. The lever 100 has a portion 110 which extends through the opening 104 and is operatively connected to a portion 112 of the body member 114. The portion 112 of the body member may include an annular groove 116 and an upper flange 118 with the lever portion 110 being positioned in the groove. As the body member is fixed in position, upward movement of lever 100 will move the handle member 102 from a closed position to an open position. Rotation of the lever 100 will control the temperature of water discharged from the faucet. The construction of FIGURE 10 is identical in all respects with the exception of those parts added to accommodate lever operation.

The use, operation and function of the invention are as follows:

The present invention is particularly directed to a simply constructed mixing valve structure in which the handle used to manipulate the valve forms a part of the valve structure itself. The overall handle structure includes both the handle proper as well as a piston member. The two are held together and are both reciprocated and rotated on a body member or valve member. An annular mixing chamber is formed both by the piston and the handle. When the handle is rotated, the temperature of the water discharge is controlled, and reciprocation of the handle is effective to turn the water off and on or to regulate the volume of water discharged.

The handle may be formed of any suitable material, and preferably of a plastic which has low heat conductivity so as to insulate the user's hand from the temperature of the water flowing through the valve. Plastic is a preferable material, although many different metals may also be satisfactorily used for the handle. The body member and the piston may also be formed of a variety of materials, both metal and plastic, and the invention should not be limited to any particular material for use in the valve.

The invention is simply constructed in that there are only three main parts, a handle, a piston, and a body member or plug. In effect, the handle and piston are fixed together to form a single structure which is both rotatably and reciprocally mounted on the body member.

The particular valve and faucet structure disclosed herein may have a variety of uses in the home, for example in a shower, in a tub, or in a combination shower and tub, a bathroom basin, and in a kitchen sink. Although a diverter structure is not shown in the present faucet, it should be obvious that a diverter may be attached and used with the valve and faucet shown herein. The faucet of FIGURE 1 shows a swivel spray aerator attached to the spout, which unit eliminates the necessity of a diverter and separate spray.

The invention has many advantages from both a construction and operational standpoint. There is only a single moving part, that being the handle which may be made up of a separate handle member and piston, or these two parts may be a single casting. Naturally the lever, when that construction is used, is considered to be a part of the handle. In any event, the handle member and piston may be separate and held together by cement, soldering or any suitable means, or cast as a single unit. When these two parts are permanently fixed together, some of the sealing members may be eliminated.

The mixing chamber has been shown in several different forms. In each case it is annular in form and within the handle means. It should be understood that the mixing chamber may be wholly in either the handle or the piston.

In effect, the handle unit which may be made up of a handle member, piston and body defines a valve assembly which is replaceable as it is the only moving part. This assembly may be in the form of a cartridge which may be easily replaced when worn.

What is claimed is:

1. In a fluid mixing valve, a body member having a plurality of inlet passages terminating on the exterior of said body member, movable means reciprocal and rotatable on said body member and including a confined circumferentially extending mixing chamber, entrance ports into said chamber, said entrance ports being in said movable means and of less circumferential extent than the chamber, outlet means in communication with said mixing chamber, selective rotation and reciprocation of said movable means relative to said body member placing said inlet passages into selective communication with said movable means mixing chamber to vary the relative proportions and volume discharged to said outlet means.

2. The structure of claim 1 further characterized by and including a plurality of entrance ports, each of less circumferential extent than said confined chamber.

3. The structure of claim 1 further characterized in that said movable means includes a piston and a handle member, said handle member being fixed to said piston and movable therewith, the exterior of said piston having an annular groove which cooperates with said handle member in forming said mixing chamber.

4. The structure of claim 1 further characterized in that said valve is opened and closed by reciprocation of said movable means.

5. The structure of claim 1 further characterized by and including interconnecting means on said movable means and body member limiting the reciprocal and rotational relative movement therebetween.

6. The structure of claim 1 further characterized in that said body member is generally cylindrical, said movable means including a generally cylindrical piston movable on said body member and a handle member fixed to said piston, and sealing means between said body member and said piston and between said piston and handle member.

7. The structure of claim 1 further characterized in that said outlet means includes an outlet passage in said movable means connected to said mixing chamber.

8. The structure of claim 1 further characterized in that said movable means includes a handle member reciprocal and rotatable relative to said body member, and a lever operatively connected to said body member for use in manipulating said handle member.

9. The structure of claim 8 further characterized by an opening in said handle member, said lever extending through said opening.

10. The structure of claim 1 further characterized by and including a support for said body member, and threaded means for attaching said body member to said support.

11. In a single handle hot and cold water mixing faucet, a body member having hot and cold water inlet passages terminating on the exterior of said body member, handle means reciprocal and rotatable on said body member and including a confined circumferentially extending mixing chamber, entrance ports into said chamber, said entrance ports being in said handle means and of less circumferential extent than the chamber, an annular seal extending peripherally about the termination of said hot water inlet passage and in sealing relationship with said handle means, an annular seal extending peripherally about the termination of said cold water inlet passage and in sealing relationship with said handle means, outlet means in communication with said circumferentially extending mixing chamber, rotation and reciprocation of said handle means relative to said body member placing said hot and cold water inlet passages into communication with said handle means mixing chamber to vary the volume and temperature of water discharged to said outlet means.

12. In a single handle hot and cold water mixing faucet, a body member having hot and cold water inlet passages terminating on the exterior of said body member, handle means reciprocal and rotatable on said body member and including a confined circumferentially extending mixing chamber, at least one portion of said chamber in said handle means being of reduced size and connecting said mixing chamber with the exterior of said body member, outlet means including an outlet passage in said body member in communication with said mixing chamber, selective rotation and reciprocation of said handle means relative to said body member placing said hot and cold water inlet passages into selective communication with said handle means mixing chamber to vary the volume and temperature of said discharge to said outlet means.

13. The structure of claim 12 further characterized in that said hot and cold water inlet passages and said outlet passages extend generally axially through said body member.

14. The structure of claim 13 further characterized by hot water and cold water ports extending generally radially outwardly in said body member.

15. The structure of claim 12 further characterized by and including a relieved area on the exterior of said body member, with said outlet passage opening into said relieved area.

16. In a single handle hot and cold water mixing faucet, a body member having hot and cold water inlet passages terminating on the exterior of said body member, handle means reciprocal and rotatable on said body member and including a confined circumferentially extending mixing chamber, at least one portion of said chamber in said handle means being of reduced size and connecting said mixing chamber with the exterior of said body member, outlet means fixed against rotation and in communication with said mixing chamber, selective rotation and reciprocation of said handle means relative to said body member placing said hot and cold water inlet passages into selective communication with said handle means mixing chamber to vary the volume and temperature of said discharge to said outlet means.

17. The structure of claim 6 further characterized in that the sealing means between the body member and piston is effective to prevent seepage along the exterior of said body member, with the sealing means between the piston and handle member being effective to prevent seepage along the exterior of said piston.

18. The structure of claim 17 further characterized by and including a pair of spaced annular grooves in the exterior surface of said body member, and sealing rings positioned in said grooves, said sealing rings and grooves being positioned on opposite sides of said hot and cold water ports.

19. The structure of claim 17 further characterized by and including a pair of spaced annular grooves on the exterior of said piston, seal rings positioned in said grooves, said grooves and seal rings being positioned on opposite sides of said annular chamber.

References Cited

UNITED STATES PATENTS

| 1,054,533 | 2/1913 | Greiner | 137—625.4 X |
| 2,551,072 | 5/1951 | Vittorio | 251—252 X |
| 2,764,181 | 9/1956 | Richolt. | |

FOREIGN PATENTS

| 688,587 | 6/1964 | Canada. |
| 1,136,533 | 5/1957 | France. |

HENRY T. KLINKSIEK, Primary Examiner

MICHAEL O. STRUM, Assistant Examiner

U.S. Cl. X.R.

137—625

PO-1050
(5/69)

UNITED STATES PATENT OFFICE
CERTIFICATE OF CORRECTION

Patent No. 3,460,571      Dated August 12, 1969

Inventor(s) Alfred M. Moen

It is certified that error appears in the above-identified patent and that said Letters Patent are hereby corrected as shown below:

Delete Figures 11, 12 and 13 from the drawings.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents